I. N. HALL.
MOWER.

No. 193,160. Patented July 17, 1877.

WITNESSES:

INVENTOR:
I. N. Hall
BY
ATTORNEYS.

UNITED STATES PATENT OFFICE.

ISAAC N. HALL, OF GARDEN GROVE, IOWA.

IMPROVEMENT IN MOWERS.

Specification forming part of Letters Patent No. 193,160, dated July 17, 1877; application filed May 12, 1877.

*To all whom it may concern:*

Figure 1:
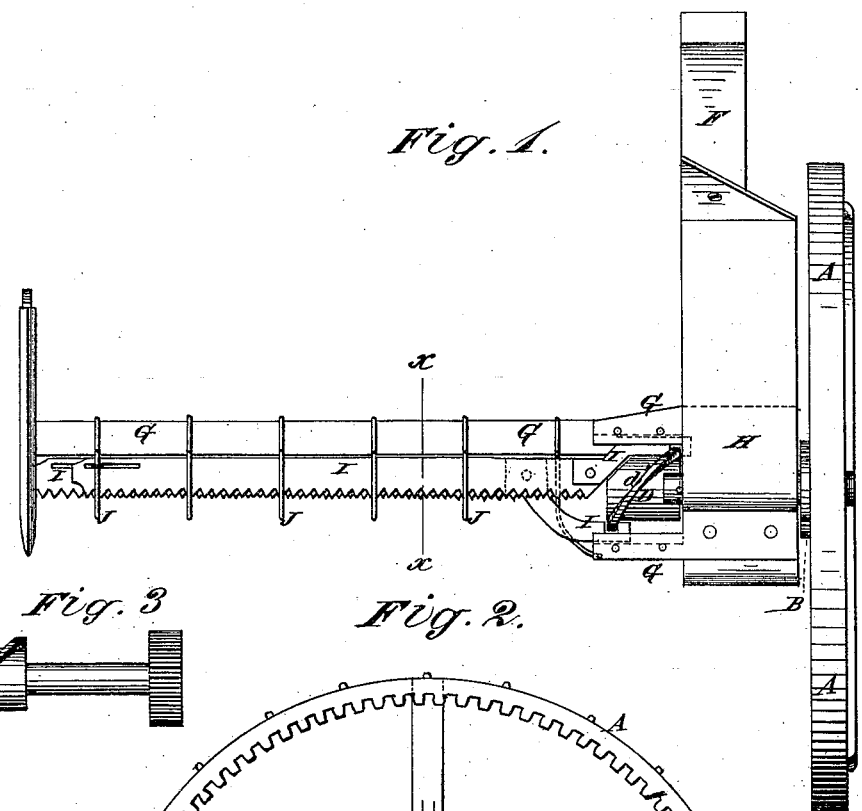
Figure 3:
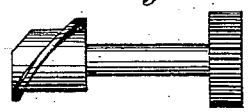
Figure 2:
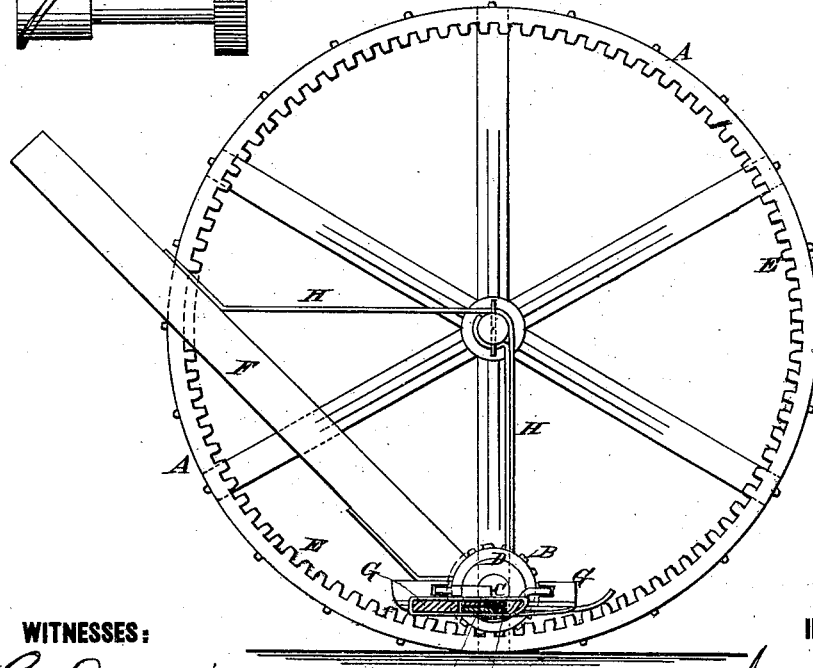

Be it known that I, ISAAC N. HALL, of Garden Grove, in the county of Decatur and State of Iowa, have invented a new and useful Improvement in Mowers and Reapers, of which the following is a specification:

Figure 1 is a top view of the cutter-bar and drive-wheel of a mower or reaper, to which my improvement has been applied. Fig. 2 is a side view of the same, the cutter-bar being shown in cross-section through the line $x\,x$, Fig. 1. Fig. 3 is a detail view of the flanged cylinder and small gear-wheel.

Similar letters of reference indicate corresponding parts.

The object of this invention is to improve the construction of the mechanism for driving the sickle-bars of mowers and reapers, so as to simplify its construction and lessen the jar and strain which accompanies the use of the crank-wheel and pitman, and thus enable the machines to be made lighter, and to be run with less power than is necessary with the ordinary constructions.

The invention consists in the combination of the large gear-wheel, the small gear-wheel, the shaft, and the diagonally-flanged cylinder with the inner ends of the two sickle-bars, the cutter-bar, and the drive-wheel, as hereinafter fully described.

A represents the drive-wheel, two of which may be used upon large machines, but one will be sufficient in small or hand machines.

Upon the inner or concave side of the rim of the wheel A is formed an internally-toothed gear-wheel, E, into the teeth of which mesh the teeth of a small gear-wheel, B.

The small gear-wheel B is formed upon or attached to the outer end of a short shaft, C, which revolves in bearings attached to the bar or arm F, to which the cutter-bar G is attached, or attached to the inner end of the cutter-bar G.

The drive-wheel A is pivoted to a bracket, H, attached to the bar F, or some other part of the frame of the machine.

Upon the inner end of the shaft C is formed a short cylinder, D, upon the face of which is formed a flange, $d'$, which passes diagonally along one side of the cylinder D, and passes back diagonally upon the other side of the said cylinder to the place of beginning.

The flange $d'$ enters grooves or notches in the inner ends of the two sickle-bars I, which ends are so formed as to be upon the opposite sides of the cylinder D, so that the said sickle-bars I may move at the same time in opposite directions.

The sickle-bars I are placed the one above the other in seats in the cutter-bar G, and in the guards J attached to said cutter-bar. The inner ends of the sickle-bars I may be directly opposite each other upon the opposite sides of the cylinder D, so as to come to a rest and change their motion at the same time, or one may be a little higher than the other, so that one may come to a rest and change its motion a little in advance of the other.

Having thus described my invention, I claim as new and desire to secure by Letters Patent—

The combination of the gear-wheels E B, the shaft C, and the diagonally-flanged cylinder D $d'$ with the inner ends of the two sickle-bars I, the cutter-bar G, and the drive-wheel A, substantially as herein shown and described.

ISAAC N. HALL.

Witnesses:
  CLARY STEARNS,
  W. H. JENNINGS.